(12) United States Patent
Baraff et al.

(10) Patent No.: US 7,864,180 B1
(45) Date of Patent: Jan. 4, 2011

(54) METHODS AND APPARATUS FOR AUTO-SCALING PROPERTIES OF SIMULATED OBJECTS

(75) Inventors: David Baraff, Oakland, CA (US); Christine Waggoner, Berkeley, CA (US)

(73) Assignee: Pixar, Emeryville, CA (US)

( * ) Notice: Subject to any disclaimer, the term of this patent is extended or adjusted under 35 U.S.C. 154(b) by 777 days.

(21) Appl. No.: 11/758,969

(22) Filed: Jun. 6, 2007

Related U.S. Application Data

(60) Provisional application No. 60/812,299, filed on Jun. 9, 2006.

(51) Int. Cl.
*G06T 15/00* (2006.01)
(52) U.S. Cl. .................. 345/473; 345/474; 345/475
(58) Field of Classification Search .......... 345/473, 345/474, 475
See application file for complete search history.

(56) References Cited

U.S. PATENT DOCUMENTS

| | | | |
|---|---|---|---|
| 6,909,431 B1 | 6/2005 | Anderson et al. | |
| 7,206,729 B2 * | 4/2007 | Baraff et al. | 703/7 |
| 7,298,374 B2 * | 11/2007 | Styles | 345/473 |
| 7,385,601 B2 * | 6/2008 | Bingham et al. | 345/420 |
| 7,463,265 B2 * | 12/2008 | Styles | 345/473 |
| 7,652,670 B2 * | 1/2010 | Styles | 345/473 |

* cited by examiner

*Primary Examiner*—Phu Nguyen
(74) *Attorney, Agent, or Firm*—Townsend and Townsend and Crew LLP

(57) ABSTRACT

A method for auto-scaling properties of simulated objects includes receiving a metric associated with a reference object. A value associated with a property of a simulated object is adjusted in response to the metric. The value of the property is related to an at-rest shape or desired rest state associated with the simulated object. The property may be a geometric property of the simulated object. Some examples of geometric properties are dimensions (e.g., length, width, height), angle, momentum and rotation, mass, density, and the like. The at-rest shape or desired rest state associated with the simulated object may be related to shape of the simulated object in response to one or more internal forces and expected external forces.

30 Claims, 6 Drawing Sheets

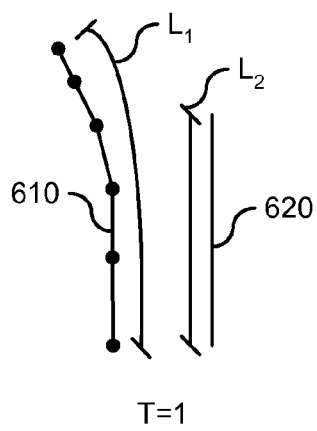
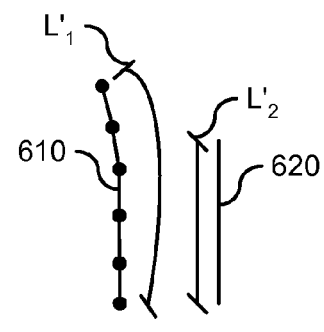
FIG. 6A
FIG. 6B
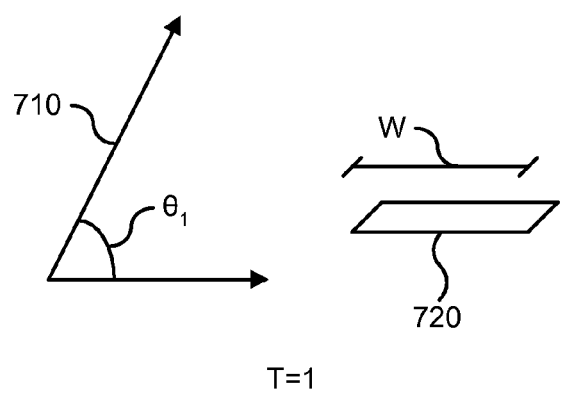
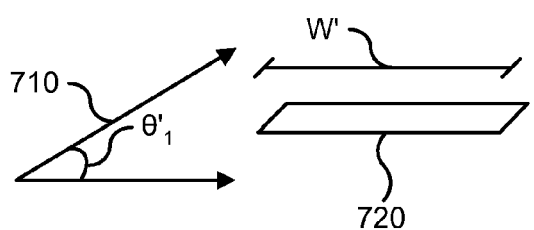
FIG. 7A
FIG. 7B

METHODS AND APPARATUS FOR AUTO-SCALING PROPERTIES OF SIMULATED OBJECTS

CROSS-REFERENCES TO RELATED APPLICATIONS

This application claims the benefit of and priority to U.S. Provisional Patent Application No. 60/812,299, filed Jun. 9, 2006 and entitled "Auto-Scaling Physical Properties of Simulated Objects in a Computer Animation," the entire disclosure of which is herein incorporated by reference for all purposes.

This application is related to U.S. patent application Ser. No. 11/758,984, filed Jun. 6, 2007 and entitled "Shape Friction: Shape Preservation of Simulated Objects in Computer Animation", and U.S. patent application Ser. No. 11,758,989, filed Jun. 6, 2007 and entitled "Velocity Drag: Shape Preservation of Simulated Objects in Computer Animation", the entire disclosures of which are herein incorporated by referenced for all purposes.

BACKGROUND OF THE INVENTION

The present invention relates to computer graphics. More specifically, the present invention relates to methods and apparatus for auto-scaling properties of simulated objects.

In computer graphics imagery, secondary objects, such as hair, clothing, and plants are often too complex for an animator to directly control at every stage of a computer animation. Instead, the animator typically specifies the physics and/or physical properties of these secondary or dynamic objects. A computer program then simulates the motions and positions of the secondary objects over time. Often physically-based numerical methods and techniques are used to simulate the secondary or dynamic objects based on the physics and/or physical properties of the individual secondary objects.

In general, for simulated clothing objects, the animator specifies the physical properties and construction of a piece of cloth. For example, the animator may specify how the cloth bends or flexes due to forces or collisions with solid objects. The animator may further specify how the cloth deforms or collides with itself. Moreover, the animator may specify external forces that act on the cloth, such as gravity and wind.

In addition to modeling the physical properties of secondary or dynamic objects, the animator may specify motions and/or positions of kinematic or non-simulated objects (e.g., characters upon which clothing objects rest). The animation of a non-simulated object generally is independent of and otherwise unaffected by motions and positions of simulated objects. However, the motions and positions of the non-simulated objects often are the principal influencer of motions and positions of simulated objects, such as the clothing and hair likely to be associated with a kinematic character.

Consider a computer animation of a human character standing upright, wearing a jacket. The human character is a kinematic or non-simulated object that may be directly animated by a skilled human animator. The animator also may specify the physics (e.g., the physical properties) of the jacket, which is to be simulated to provide the animation of the jacket. In addition, the animator may models how the jacket is associated with or worn by the human character. Typically, during simulation, a computer program simulates the motions and positions of the jacket using physically-based numerical techniques in response to external forces and the motions and positions of the human character as specified by the animator.

If the physical properties and external forces acting on a simulated object are accurately modeled, the resulting motion of the simulated object will be plausible and seemingly realistic. In the jacket example, the cloth of the jacket should hang down and fold naturally as worn by the human character. Furthermore, the cloth should react according to the motions and positions of the human character when worn by the human character. However, modeling the jacket to appear to behave in a truly accurate manner is a delicate balance between the limitations and complexities of the animator's knowledge of physics and particle systems on the one hand and budgetary and time constraints on the other.

Additionally, several problems exist with physically-based numerical methods and techniques used in computer animations where kinematic or non-simulated objects are animated in physically exaggerated or cartoon style manners. Specifically, the animator may change the basic geometry or proportions of a primary character of a scene in non-physical or unrealistic manners. The unrealistic animation of the primary character requires that secondary or dynamic objects associated with the primary character that are being simulated react in special ways to accommodate the exaggerated animation. Often, the manners in which simulated objects react to the physically exaggerated non-simulated objects are visually undesirable.

Accordingly, what is desired are improved methods and apparatus for auto-scaling physical properties of simulated objects without some of the drawbacks discussed above.

BRIEF SUMMARY OF THE INVENTION

The present invention relates to computer graphics. More specifically, the present invention relates to methods and apparatus for auto-scaling properties of simulated objects.

In various embodiments, a method for simulating objects includes receiving a metric associated with a reference object. A value associated with a property of a simulated object is adjusted in response to the metric. The value of the property is related to a rest state associated with the simulated object.

In one embodiment, the property is a geometric property of the simulated object. Some examples of geometric properties are dimensions (e.g., length, width, height), angle, momentum and rotation, mass, density, and the like. The rest state associated with the simulated object may be related to shape of the simulated object in response to one or more internal forces associated with the simulated object.

In some embodiments, adjusting the value associated with the property includes either increasing or decreasing the value of the property in response to the metric. Receiving the metric associated with the reference object may include determining a set of values associated with one or more physically exaggerated animation variables of the reference object. Receiving the metric associated with the reference object may further include determining a set of measurements associated with one or more properties of the reference object, wherein the one or more properties comprise at least one of a length, an angle, motion, position, and mass. Receiving the metric associated with the reference object may further include calculating a length between one or more locations associated with a surface of the reference object.

In further embodiments, the reference object is a non-simulated character object. The simulated object may be a cloth object. The simulated object may be rendered according to the rest state associated with the simulated object. The simulated object may also be displayed as an element of a computer animation display.

In various embodiments, a computer program product is stored on a computer readable medium for simulating objects. The computer program product includes code for receiving a metric associated with a reference object, and code for adjusting a value associated with a property of a simulated object in response to the metric, wherein the value of the property is related to a rest state associated with the simulated object.

In one embodiment, a system for simulating objects includes a processor and a memory. The memory is coupled to the processor and configured to store a set of instructions which when executed by the processor configure the processor to receive a metric associated with a reference object, and adjust a value associated with a property of a simulated object in response to the metric, wherein the value of the property is related to a rest state associated with the simulated object.

In some embodiments, a method for simulating elements of a computer animation display includes identifying a portion of a reference object. A change is detected in the portion of the reference object. In response to the change, a property of a simulated object is adjusted where the property is related to the at-rest shape of the simulated object.

One or more properties associated with the portion of the reference object may then be monitored. Detecting the change in the portion of the reference object may include detecting a change in a set of values associated with the one or more properties. Adjusting the property of the simulated object may include adjusting a value associated with a geometric property of the simulated object. Adjusting the property of the simulated object may include adjusting at least one of mass and density associated with the simulated object.

In some embodiments, a computer program product is stored on a computer readable medium for simulating elements of a computer animation display. The computer program product includes code for identifying a portion of a reference object, code for detecting a change in the portion of the reference object, and code for adjusting a property of a simulated object in response to the change, the property related to the at-rest shape of the simulated object.

In some embodiments, a system for simulating elements of a computer animation display includes a processor and a memory. The memory is coupled to the processor and configured to store a set of instructions which when executed by the processor configure the processor to identify a portion of a reference object, detect a change in the portion of the reference object, and in response to the change, adjust a property of a simulated object, the property related to the at-rest shape of the simulated object.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

FIGS. 6A and 6B are illustrations depicting auto-scaling length of a simulated object in response to length of a non-simulated object in one embodiment according to the present invention.

FIGS. 7A and 7B are illustrations depicting auto-scaling width of a simulated object in response to an angle associated with a non-simulated object in one embodiment according to the present invention.

DETAILED DESCRIPTION OF THE INVENTION

The present invention relates to computer graphics. More specifically, the present invention relates to methods and apparatus for auto-scaling properties of simulated objects.

In various embodiments, a simulated object is associated with a reference object. In general, a reference object may be any kinematic, non-simulated object, or simulated object. The reference object may also be a copy of the simulated object, such as at a different time or state. In some embodiments, the rendering and/or display of elements of a computer animation display is provided. The computer animation display may include secondary or dynamic objects, such as cloth, garments and clothing, hair, and fur. The computer animation display may further include kinematic or non-simulated objects, such as characters and/or collision objects.

Typically simulated objects are model, described, or represented as a collection of particles, connected to each other in some manner. In one example, a topological mesh is used in the case of clothing. In another example, a collection of strands or linear objects are used to describe hair or fur. Techniques according to auto-scaling properties of simulated objects allows a simulation computer program to better display in visually desirable manners simulated objects that response to changes in motions and positions of reference or non-simulated objects.

Figure 1:
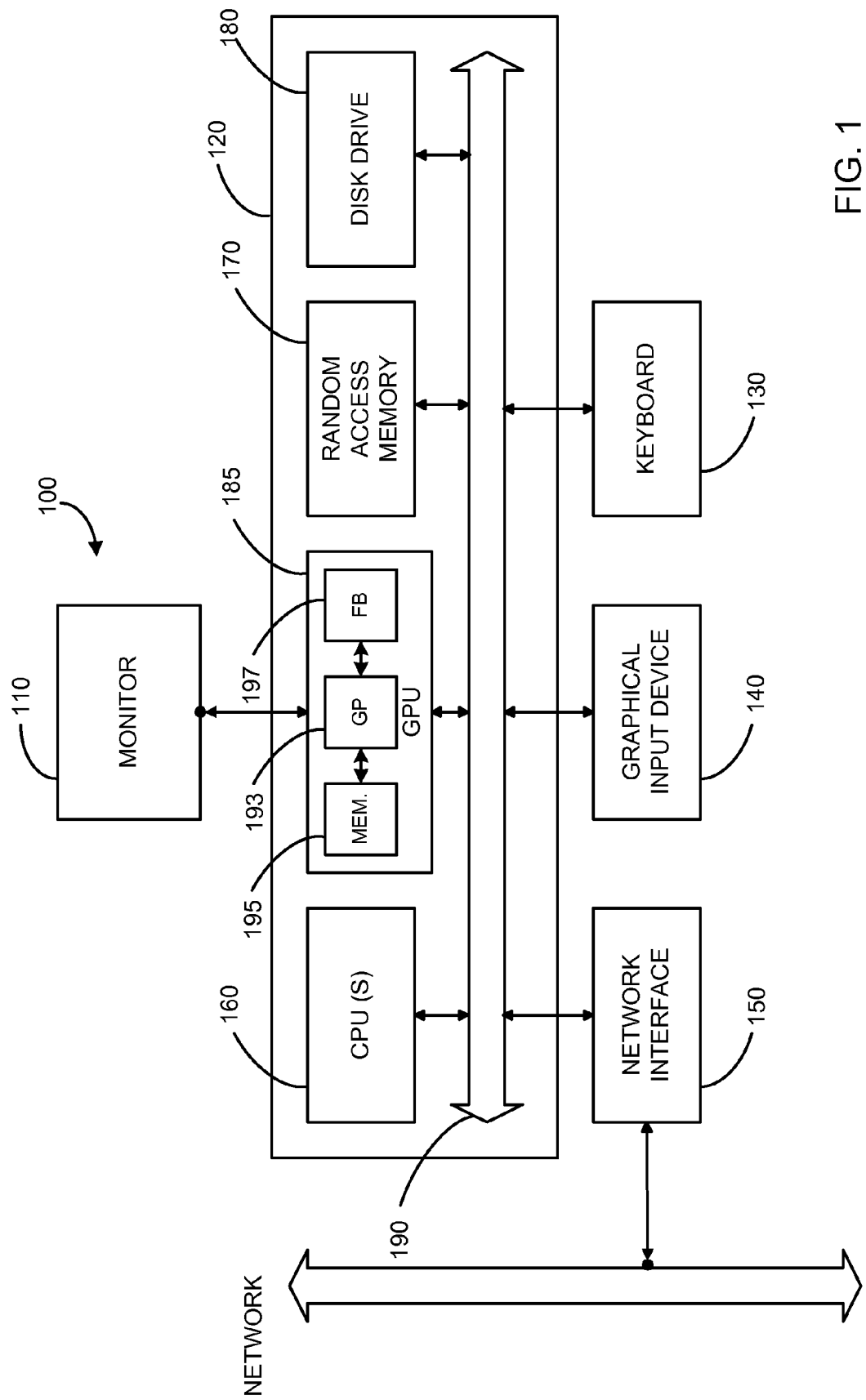
FIG. 1 is a block diagram of a computer system that may be used to practice embodiments of the present invention.

FIG. 1 is a block diagram of a computer system 100 that may be used to practice embodiments of the present invention.

In one embodiment, computer system 100 typically includes a monitor 110, computer 120, a keyboard 130, a user input device 140, computer interfaces 150, and the like.

In various embodiments, user input device 140 is typically embodied as a computer mouse, a trackball, a track pad, a joystick, wireless remote, drawing tablet, voice command system, eye tracking system, and the like. User input device 140 typically allows a user to select objects, icons, text and the like that appear on the monitor 110 via a command such as a click of a button or the like.

Embodiments of computer interfaces 150 typically include an Ethernet card, a modem (telephone, satellite, cable, ISDN), (asynchronous) digital subscriber line (DSL) unit, FireWire interface, USB interface, and the like. For example, computer interfaces 150 may be coupled to a computer network, to a FireWire bus, or the like. In other embodiments, computer interfaces 150 may be physically integrated on the motherboard of computer 120, and may be a software program, such as soft DSL, or the like.

In various embodiments, computer 120 typically includes familiar computer components such as a processor 160, and memory storage devices, such as a random access memory (RAM) 170, disk drives 180, a GPU 185, and system bus 190 interconnecting the above components.

In some embodiment, computer 120 includes one or more Xeon microprocessors from Intel. Further, one embodiment, computer 120 includes a UNIX-based operating system.

RAM 170 and disk drive 180 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 185 may be any conventional graphics processing unit that may be user programmable. Such GPUs are available from NVIDIA, ATI, and other vendors. In this example, GPU 185 includes a graphics processor 193, a number of memories and/or registers 195, and a number of frame buffers 197.

FIG. 1 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

In various embodiments, computer system 100 enables auto-scaling of properties of a simulated object associated with a reference object. For example, in an animation where a human character (e.g., a reference object) is wearing a jacket (e.g., a simulated object), and the human character has been animated in a cartoony or physically exaggerated manner, computer system 100 automatically adjusts the at-rest shape (or rest state) of the cloth forming the jacket. Thus, the jacket attempts to maintain itself in a new at-rest shape or desired rest state. Thus, the jacket appears to fold, wrinkle, and hang down normally as if the human character was not animated in the cartoony or physically exaggerated manner.

Accordingly, in one embodiment, computer system 100 receives a metric associated with a reference object. In response to the metric, computer system 100 adjusts a value associated with a property of a simulated object in response to the metric. In various embodiments, the value associated with the property of the simulated object is related to the at-rest shape or a desired rest state of the simulate object.

Thus, computer system 100 enables the automatic monitoring, detection, calculating, or measuring of a reference object (e.g., a non-simulated or kinematic object) and the communication of a metric indicative of the calculation or measurement to a simulated object associated with the reference object. Computer system 100 uses the metric to automatically adjust how the simulated object reacts to itself and expected external forces to maintain its shape. Thus, the at-rest shape or desired rest state of the simulated object may be automatically adjusted by computer system 100 to provide more visually pleasant animations of the simulated object.

Consider again the animation of the human character, standing upright and wearing the jacket. The human character (i.e., a reference or non-simulated object) is directly animated, while motions and positions of the jacket (i.e., the simulated or dynamic object) are simulated using physically-based numerical techniques in response to the human character's animation. According to techniques of the present invention, the actual length is changed of a torso area of the jacket in response to changes in the human character's measurements, such as when the human character is animated in a physically exaggerated manner. The jacket is not shrunk or stretched in response to the human character's measurements, but the at-rest shape or desired rest state is adjusted to be at the new actual length of the human character. In one example, a geometric property related to the desired rest state of the torso area of the jacket is adjusted to achieve a more desired look or realistic feel during animation.

Figure 2:
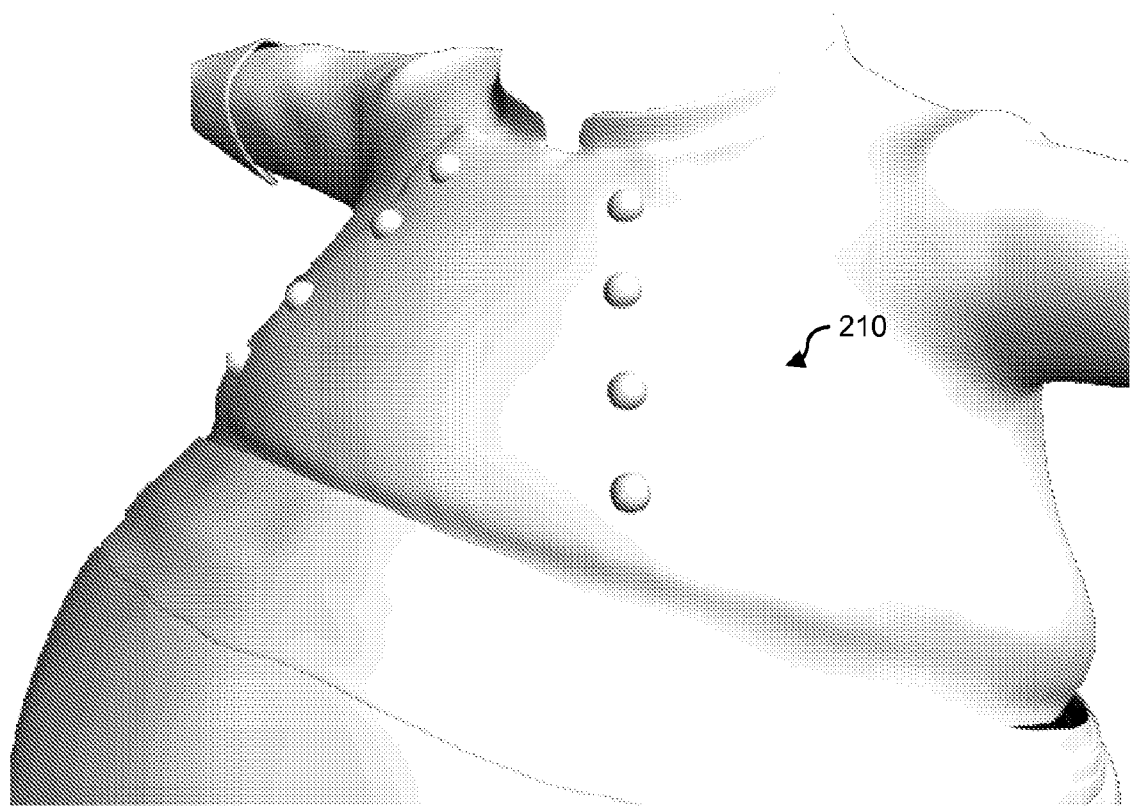
FIG. 2 is a screenshot depicting a human character wearing a jacket at pose-time in one embodiment according to the present invention.

FIG. 2 is a screenshot depicting a human character wearing a jacket at pose-time in one embodiment according to the present invention. The human character of FIG. 2 is wearing a jacket whose motion may be simulated by computer system 100 using a physically-based numerical technique. Additionally, motions and positions of the jacket may be influenced by motions and positions of the human character (e.g., the reference object). FIG. 2 shows that that the jacket (or the cloth of the jacket) fits relatively snug in portion 210 on the human character. For example, there are little or no wrinkles present around the neck and along the torso of the human character in portion 210.

Figure 3A:
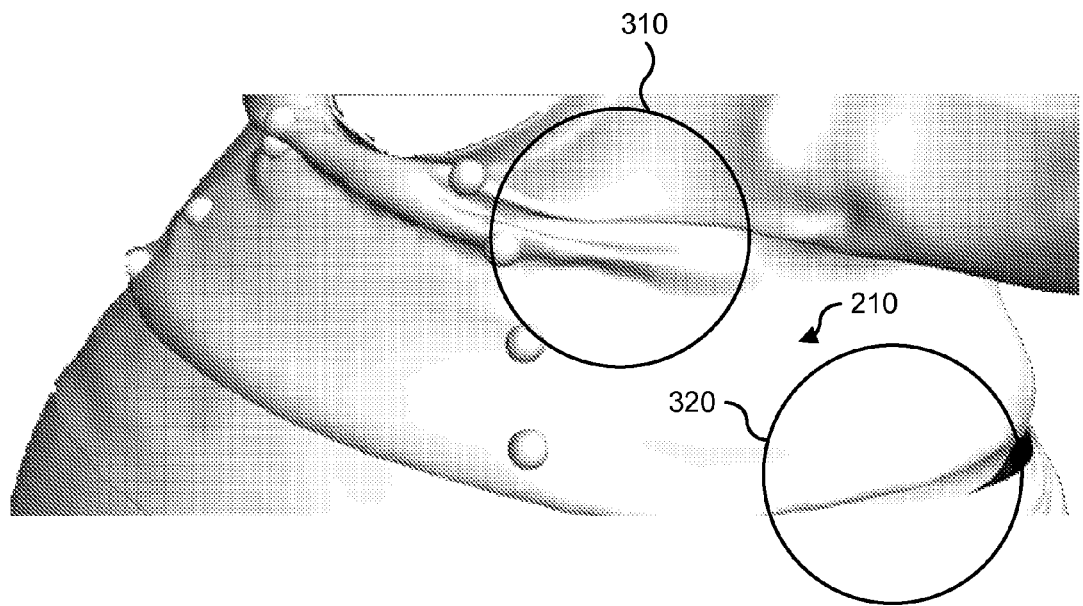
FIG. 3A is a screenshot depicting the human character of FIG. 2 in a physically exaggerated pose where the jacket includes visually undesirable features in one embodiment according to the present invention.

FIG. 3A is a screenshot depicting the human character of FIG. 2 in a physically exaggerated pose where the jacket includes visually undesirable features in one embodiment according to the present invention. FIG. 3A depicts the human character bent forward. In this example, the human character has been posed by the animator in a physically exaggerated manner such that a neck-to-waist measurement of the human character is reduced.

FIG. 3A depicts that without using techniques of the present invention, the cloth of the jacket bunches and produces extra material and an unpleasant puckering around the neck. For example, in area 310, wrinkles are present around the neck of the human character at the top of portion 210. Additionally, in area 310, wrinkles are present along the torso where the cloth of the jacket produces extra folding-over at the waistline of the human character at the bottom of portion 210.

Figure 3B:
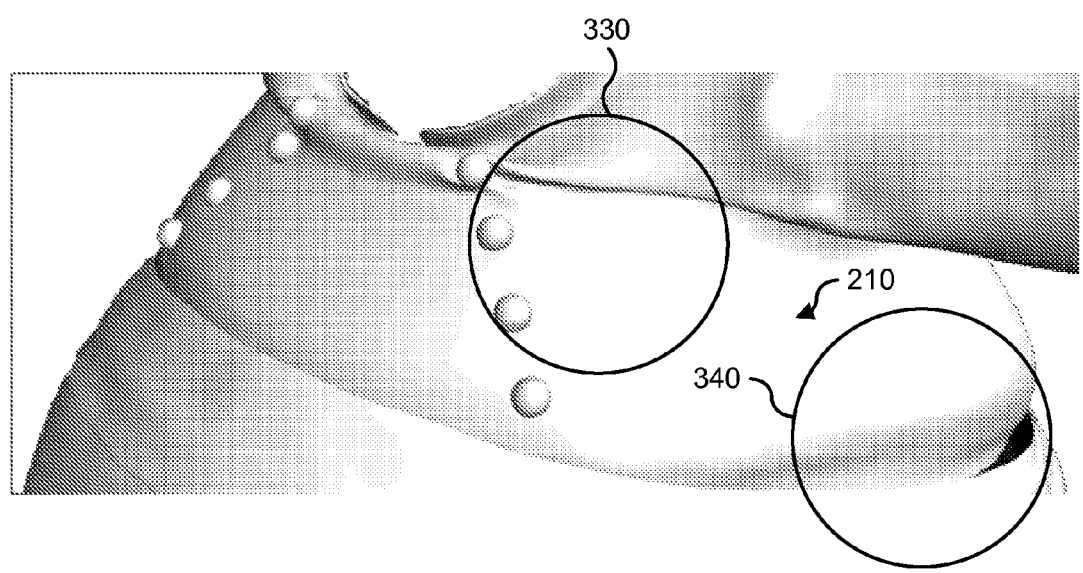
FIG. 3B is a screenshot depicting the human character of FIG. 2 in a physically exaggerated pose where a portion of the jacket has been auto-scaled to reduce visually undesirable features in one embodiment according to the present invention.

FIG. 3B is a screenshot depicting the human character of FIG. 2 in a physically exaggerated pose where a portion of the jacket has been auto-scaled to reduce visually undesirable features in one embodiment according to the present invention. FIG. 3B also depicts the human character bent forward in the same pose by the animator in which the neck-to-waist measurement of the human character is reduced. By applying techniques of auto-scaling properties of simulated objects, FIG. 3B depicts that the bunching, extra material, and an unpleasant puckering around the neck, as previously show in area 310, is reduced in area 330 at the top of portion 210. In addition, FIG. 3B depicts a reduction in area 340 at the bottom of portion 210 in the extra folding-over at the waistline of the human character, as previously depicted in area 320.

Thus, computer system 100 enables an automatic reduction in the length of the front portion 210 of the jacket as the neck-to-waist measurement of the human character is reduced. Advantageously, by monitoring properties (e.g., geometric properties) of the human character, and adjusting a property (e.g., the desired rest length) of portion 210 of the jacket, computer system 100 reduces extra material of the jacket that would otherwise cause the unpleasant puckering around the neck and the extra folding over at the waistline.

Accordingly, in various embodiments, communication of changes in a reference or non-simulated object, such as changes in length, width, and height of a geometric property is provided to a simulated object associated with the non-simulated object. Thus, one or more properties of the simulated object (such length, width, height, angle, momentum, rotation, mass, and density) may be automatically changed or adjusted. This alters the at-rest shape or desired rest state that the simulated object seeks to maintain with the property to provide a more visually pleasant animation, such as reducing extra folds and wrinkles in clothing.

Figure 4:
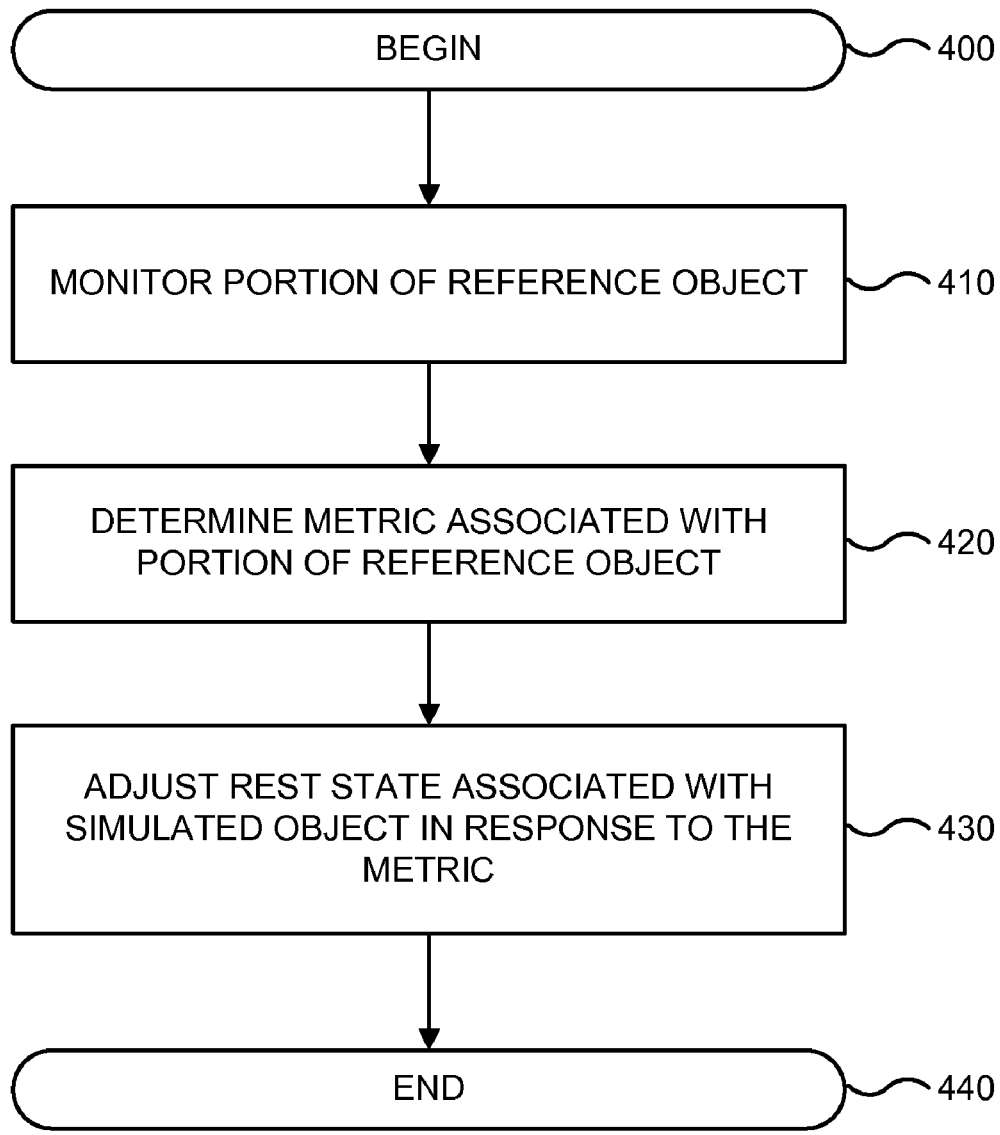
FIG. 4 is a simplified flowchart of a method for auto-scaling properties of a simulated object associated with a reference object in one embodiment according to the present invention.

FIG. 4 is a simplified flowchart of a method for auto-scaling properties of a simulated object associated with a reference object in one embodiment according to the present invention. The processing depicted in FIG. 4 may be performed by software modules (e.g., instructions or code) executed by a processor of a computer system, by hardware modules of the computer system, or combinations thereof. FIG. 4 begins in step 400.

In step 410, computer system 100 monitors a portion of a reference object. In some embodiments, computer system 100 measures a property associated with the reference object. Some examples of properties are geometric properties (e.g., position, location, dimensions, distance, length, width, height, and angle), physical properties (e.g., mass, weight, velocity, acceleration, motion, position, momentum), animator specified properties, and the like. Some examples of reference objects are kinematic or non-simulated objects, simulated objects, and the like.

In step 420, computer system 100 determines a metric associated with the portion of the reference object. In general, a metric is any result or indication of a calculation, determination, or measurement. A metric may be indicative of a scalar value, a vector value, an angle, a coordinate system, location, a range, a difference, a higher/lower indicator, and the like.

Consider again our exemplary animation of the human character of FIG. 2, standing upright and wearing a jacket. In this example, the human character is provided with a curve from the neck to the waist of the human character. The curve includes one or more points along the curve. To determine a metric associated with the portion of the human character from the neck to the waist, computer system 100 measures distances between the one or more points along the curve to determine the entire length of the curve, and hence the length of the neck to waist portion of the human character. In another example, to determine a metric associated with the human character, computer system 100 calculates an angle of a knee joint associated with the human character.

In some embodiments, computer system 100 may generate a signal indicative of the metric, and communicate the signal to the simulated object. A signal is any message, act, or event that conveys or indicates information. In one example, computer system 100 generates a message including the metric, and transmits the message to the simulated object. In another example, computer system 100 instructs a computer simulation program to read the metric from an address in memory during simulation.

In step 430, computer system 100 adjusts a rest state associated with the simulated object in response to the metric. In general, physical simulation (i.e., physically-based numerical techniques) of objects employs modeling the physics, such as internal forces and stresses, arising inside the object as well as external forces, such as gravity and collisions with other objects. One of the key parameters of physically-based numerical techniques is the at-rest shape or desired rest state of a simulated object.

An at-rest shape or rest state describes the size and shape that a simulated object seeks to maintain absent external forces and/or in light of expected external forces like gravity. For example, the jacket associated with the human character has a length of 100 cm in a desired rest state. While the jacket is stretched, the jacket is not longer in the desired rest state and may have a length of 105 cm. After the stretching, the length of the jacket returns to the desired rest state (or at-rest shape) and remains at 100 cm in response to internal forces that model the physics of the cloth that forms the jacket.

In the example of the jacket, in response to a physically exaggerated animation of the human character, in which the neck to waist length of the human character decreases, computer system 100 adjusts, or in this case reduces, the length of the torso area of the jacket to a desired rest state of 90 cm. Computer system 100 has not shrunk the jacket as the sleeves and other portions of the jacket may retain their initial construction. Instead, computer system 100 adjusts a property of a portion of the jacket (e.g., the torso area) where the property is related to the at-rest shape or desired rest state. Advantageously, the adjusting of a property related to the desired rest state of the jacket, computer system 100 achieves a more desired look or realistic feel of the jacket during animation.

Accordingly, in various embodiments, computer system 100 does not stretch or shrink the simulated object, but changes the construction of the simulated object. Thus, the shape of the simulated object that it seeks to maintain absent stretching or polling forces has been altered in response to changes, for example, in the shape of the reference object. FIG. 4 ends in step 440.

Figure 5:
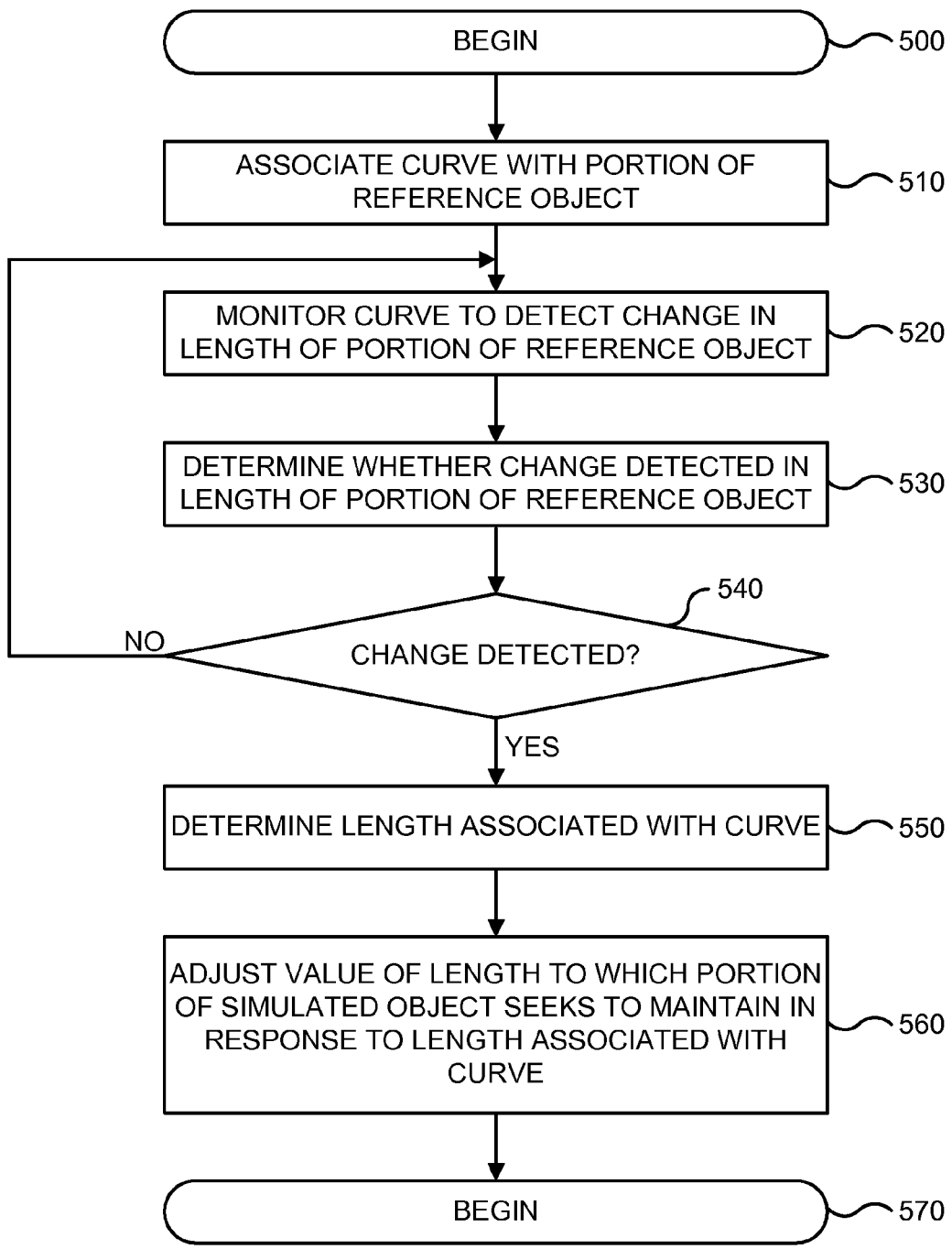
FIG. 5 is a flowchart of a method for auto-scaling the length to which a simulated object seeks to maintain at rest in response to changes in a reference object in one embodiment according to the present invention.

FIG. 5 is a flowchart of a method for auto-scaling the length to which a simulated object seeks to maintain at rest in response to changes in a reference object in one embodiment according to the present invention. FIG. 5 begins in step 500.

In step 510, a curve is associated with a portion of a reference object. In step 520, computer system 100 monitors the curve to detect a change in the length of the portion of the reference object. For example, computer system 100 may periodically or constantly monitor the curve for changes in one or more physical properties associated with the portion of the reference object.

In step 530, computer system 100 determines whether a change is detected in the length of the portion of the reference object. Based on a negative determination in step 540, computer system 100 continues processing in step 520 to monitor the curve to detect a change in the length of a portion of the reference object. Based on a positive determination in step 540, computer system 100 determines the current length of the portion of the reference object in step 550.

In step 560, computer system 100 adjusts a value of the length to which portion of the simulated object seeks to maintain in response to current length associated with curve. FIG. 5 ends in step 570.

FIGS. 6A and 6B are illustrations depicting auto-scaling length of a simulated object in response to length of a non-simulated object in one embodiment according to the present invention.

FIG. 6A depicts a curve 610 of a non-simulated object having a length $L_1$ associated with a line 620 of a simulated object having a length $L_2$ at time $T_1$. The black dots represent a set of points along curve 610. In this example, motions and positions of line 620 are influenced by motions and positions of curve 620. Additionally, the motions and positions of line 620 are simulated using physically-based numerical techniques.

FIG. 6B depicts curve 610 at time $T_2$. In this example, the length of curve 610 at time $T_2$ is $L'_1$ where $L_1 > L'_1$. Computer system 100 measures the length $L'_1$ of curve 610 at time $T_2$. Computer system 100 generates a signal to line 620 in response to the length $L'_1$ of curve 610. Computer system 100 then adjusts the length of line 620 to $L'_2$ in response to the signal. The length of line 620 in FIG. 6B is such that $L_2 > L'_2$.

FIGS. 7A and 7B are illustrations depicting auto-scaling width of a simulated object in response to an angle associated with a non-simulated object in one embodiment according to the present invention.

FIG. 7A depicts a joint 710 associated with a non-simulated object having angle θ and a surface 720 associated with a simulated object having a width W at time $T_1$. In this example, motions and positions of surface 720 are influenced by motions and positions of joint 710. Additionally, the motions and positions of surface 720 are simulated using physically-based numerical techniques.

FIG. 7B depicts joint 710 at time $T_2$. In this example, the angle of joint 710 is θ' where θ<θ'. Computer system 100 calculates the angle θ' of joint 710 at time $T_2$. Computer system 100 generates a signal to surface 720 in response to the angle θ' of the joint 710. Computer system 100 then adjusts the width of surface 720 to W' in response to the signal. The width of surface 720 in FIG. 7D is such that W<W'.

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for simulating motion of objects, the method comprising:

receiving, at one or more computer systems, information specifying a property of an object whose motion is determined by a simulation of the object according to a model defining physics of the simulation, the property related to a rest state of the object in the simulation;

receiving, at the one or more computer systems, information specifying a metric associated with a reference object;

modifying, with one or more processors associated with the one or more computer systems, a value for the property of the object in response to the metric to invoke a change in the rest state of the object; and storing the modified value for the property of the object in a storage device associated with the one or more computer systems.

2. The method of claim 1 wherein receiving the information specifying the property of the object comprises receiving a geometric property of the object.

3. The method of claim 1 wherein shape of the object is related to the rest state of the object, the shape of the object configured to respond to one or more forces in the simulation seeking to maintain the shape of the object that are a function of the shape and the rest state.

4. The method of claim 1 wherein modifying the value for the property of the object in response to the metric comprises either increasing or decreasing the value of the property of the object.

5. The method of claim 1 wherein receiving the information specifying the metric associated with the reference object comprises a set of values associated with one or more physically exaggerated animation variables of the reference object.

6. The method of claim 1 wherein receiving the information specifying the metric associated with the reference object comprises receiving a set of measurements associated with one or more properties of the reference object, wherein the one or more properties comprise at least one of a length, an angle, motion, position, or mass.

7. The method of claim 1 wherein receiving the information specifying the metric associated with the reference object further comprises receiving a length determined between one or more locations associated with a surface of the reference object.

8. The method of claim 1 wherein the reference object comprises a non-simulated character object.

9. The method of claim 1 wherein the object comprises a cloth object.

10. The method of claim 1 further comprising:
displaying the object on a display device.

11. A non-transitory computer-readable medium storing computer-executable code for simulating motion of objects, the computer-readable medium comprising:

code for receiving a property of an object whose motion is determined by a simulation of the object according to a model defining physics of the simulation, the property related to a rest state of the object in the simulation;

code for receiving a metric associated with a reference object; and code for modifying a value for the property of the object in response to the metric to invoke a change in the rest state of the object.

12. The computer-readable medium of claim 11 wherein the code for receiving the property of the object comprises code for receiving a geometric property of the object.

13. The computer-readable medium of claim 11 wherein shape of the object is related to the rest state of the object, the shape of the object configured to respond to one or more forces in the simulation seeking to maintain the shape of the object that are a function of the shape and the rest state.

14. The computer-readable medium of claim 11 wherein the code for modifying the value for the property of the object in response to the metric comprises code for either increasing or decreasing the value of the property of the object.

15. The computer-readable medium of claim 11 wherein the code for receiving the metric associated with the reference object comprises code for receiving a set of values associated with one or more physically exaggerated animation variables of the reference object.

16. The computer-readable medium of claim 11 wherein the code for receiving the metric associated with the reference object comprises code for receiving a set of measurements associated with one or more properties of the reference object, wherein the one or more properties comprise at least one of a length, an angle, motion, position, or mass.

17. The computer-readable medium of claim 11 wherein the code for receiving the metric associated with the reference object comprises code for receiving a length determined between one or more locations associated with a surface of the reference object.

18. The computer-readable medium of claim 11 wherein the reference object comprises a non-simulated character object.

19. The computer-readable medium of claim 11 wherein the object comprises a cloth object.

20. The computer-readable medium of claim 11 further comprising:

code for simulating the object, wherein the simulation uses the modified value for the property of the object.

21. A system for simulating motion of objects, the system comprising:

a processor; and a memory coupled to the processor and configured to store a set of instructions, the set of instructions including:

instructions configured to information specifying a property of an object whose motion is determined by a simulation of the object according to a model defining physics of the simulation, the property related to a rest state of the object in the simulation;

instructions configured to receive information specifying a metric associated with a reference object; and instructions configured to modify a value for the property of the object in response to the metric to invoke a change in the rest state of the object.

22. The system of claim 21 wherein the instructions configured to receive information specifying the property of the object comprises instructions configured to receive a geometric property of the object.

23. The system of claim 21 wherein shape of the object is related to the rest state of the object, the shape of the object configured to respond to one or more forces in the simulation seeking to maintain the shape of the object that are a function of the shape and the rest state.

24. The system of claim 21 wherein the instructions configured to modify the value for the property of the object in response to the metric comprise instructions configured to either increase or decrease the value of the property of the object.

25. The system of claim 21 wherein the instructions configured to receive the metric associated with the reference object comprises instructions configured to receive a set of values associated with one or more physically exaggerated animation variables of the reference object.

26. The system of claim 21 wherein the processor the instructions configured to receive the metric associated with the reference object comprises instructions configured to receive a set of measurements associated with one or more properties of the reference object, wherein the one or more properties comprise at least one of a length, an angle, motion, position, or mass.

27. The system of claim 21 wherein the instructions configured to receive the metric associated with the reference object comprises instructions configured to receive a length determined between one or more locations associated with a surface of the reference object to determine the metric.

28. The system of claim 21 wherein the reference object comprises a non-simulated character object.

29. The system of claim 21 wherein the object comprises a cloth object.

30. The system of claim 21 further comprising instructions configured to simulate the object and display the object, wherein the simulation uses the modified value for the property of the object.

* * * * *